(12) United States Patent
Ko (10) Patent No.: US 12,043,237 B2
(45) Date of Patent: Jul. 23, 2024

(54) ELECTRIC BOOSTER AND CONTROL METHOD THEREFOR

(71) Applicant: HYUNDAI MOBIS CO., LTD., Seoul (KR)

(72) Inventor: Ji Weon Ko, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 218 days.

(21) Appl. No.: 17/889,477

(22) Filed: Aug. 17, 2022

(65) Prior Publication Data
US 2023/0088817 A1 Mar. 23, 2023

(30) Foreign Application Priority Data
Sep. 16, 2021 (KR) .......................... 10-2021-0123934

(51) Int. Cl.
*B60T 8/172* (2006.01)
*B60T 8/171* (2006.01)
*B60T 13/16* (2006.01)
*B60T 13/74* (2006.01)

(52) U.S. Cl.
CPC .............. *B60T 8/172* (2013.01); *B60T 8/171* (2013.01); *B60T 13/162* (2013.01); *B60T 13/745* (2013.01); *B60T 2220/04* (2013.01); *B60T 2270/60* (2013.01)

(58) Field of Classification Search
CPC ........ B60T 8/172; B60T 8/171; B60T 13/162; B60T 13/745; B60T 2220/04; B60T 2270/60; B60T 2270/604

USPC ........................................................... 701/70
See application file for complete search history.

(56) References Cited

U.S. PATENT DOCUMENTS

| 2014/0316642 | A1* | 10/2014 | Kim ...................... B60T 7/042 |
| | | | 701/33.9 |
| 2019/0217830 | A1* | 7/2019 | Masuda .................. B60T 13/74 |
| 2021/0053410 | A1* | 2/2021 | Park .................... B60G 17/0195 |
| 2021/0078555 | A1* | 3/2021 | Kim ..................... B60T 13/142 |

FOREIGN PATENT DOCUMENTS

CN 113119936 * 7/2021

* cited by examiner

*Primary Examiner* — Muhammad Shafi
(74) *Attorney, Agent, or Firm* — NovoTechIP International PLLC (57) ABSTRACT

The present disclosure provides an electric booster comprising: a motor piston configured to be moved by a motor; an operating rod configured to be moved in a direction parallel to a moving direction of the motor piston; a reaction disc configured to be pressed and moved by at least one of the motor piston and the operating rod; a master cylinder configured to generate a hydraulic pressure as the reaction disc moves; and a control unit controlling the operation of the motor, wherein the control unit receives the stroke of the brake pedal, calculates a required hydraulic braking force and a required stepping force based on the pedal stroke, and determines a required displacement of the motor piston for generating the required hydraulic braking force and the required stepping force using a contact area between the operating rod and the reaction disc.

9 Claims, 8 Drawing Sheets

ELECTRIC BOOSTER AND CONTROL METHOD THEREFOR

CROSS-REFERENCE TO RELATED APPLICATIONS

This application is based on, and claims priority from, Korean Patent Application Number 10-2021-0123934, filed Sep. 16, 2021, the disclosure of which is incorporated by reference herein in its entirety.

TECHNICAL FIELD

The present disclosure relates to an electric booster and a control method thereof.

BACKGROUND

The content described in this section merely provides the background information on the present disclosure and does not constitute the prior art.

A device for braking an electric booster is a device that assists a braking force by boosting a driver's pedal stepping force using a booster based on an electric motor.

The electric booster braking device includes an electric booster unit so as to boost the pedal stepping force by a driver. The electric booster unit uses the rotational torque of the electric motor provided in the electric booster unit to boost the force of pressing the inside of a master cylinder by an operating rod. Further, the electric booster unit is configured to provide a required stepping force to a driver when the stepping force is formed. To be more specific, a spring and a reaction disc are pressed by the electric booster unit to form a proper stepping force corresponding to the pedal stroke.

The regenerative braking is a braking method in which the motor is operated as a generator using the driving inertia of a vehicle, and resistance generated due to the operation of the motor is used as a braking force. In the case of a Hybrid Electric Vehicle (HEV), a regenerative braking unit and a hydraulic braking unit cooperate to brake the vehicle, so that a stable braking force may be supplied to the vehicle.

The electric booster may be configured such that the regenerative braking unit and the hydraulic braking unit cooperate to brake the vehicle only in an initial pedal section where the stepping force is formed only with a spring, and then the regenerative braking is stopped and the vehicle is braked only with hydraulic braking force in a pedal section where the stepping force is generated by the reaction disc.

However, a conventional vehicle equipped with the regenerative braking unit and the hydraulic braking unit reduces hydraulic pressure in proportion to a brake compensation amount according to the regenerative braking using an electronic stability control (ESC) during regenerative braking. Therefore, the conventional vehicle is problematic in that it requires an ESC operating unit having a specification capable of cooperative control of regenerative braking and hydraulic braking, thus leading to an increase in cost.

In addition, in the electric booster in which the regenerative braking unit and the hydraulic braking unit cooperate to brake the vehicle only in the initial pedal section, if the regenerative braking section is extended to improve fuel efficiency, a driver may feel a different pedal feel.

SUMMARY

According to at least one embodiment, the present disclosure provides an electric booster comprising: a motor piston configured to be rectilinearly moved by an operation of a motor; an operating rod configured to be rectilinearly moved in a direction parallel to a moving direction of the motor piston by a driver's pedal force; a reaction disc configured to be pressed and moved by at least one of the motor piston and the operating rod; a master cylinder configured to form a hydraulic pressure as the reaction disc moves; a pedal sensor detecting a stroke of a brake pedal; and a control unit controlling the operation of the motor, wherein the control unit receives the stroke of the brake pedal from the pedal sensor, calculates a required hydraulic braking force and a required stepping force based on the pedal stroke, and determines a required displacement of the motor piston for generating the required hydraulic braking force and the required stepping force using a contact area between the operating rod and the reaction disc.

According to at least one embodiment, the present disclosure provides a method of controlling an electric booster comprising a reaction disc and a master cylinder configured to form a hydraulic pressure as the reaction disc moves, wherein the reaction disc is pressed by at least one of a motor piston configured to be rectilinearly moved by an operation of a motor and an operating rod configured to be rectilinearly moved in a direction parallel to a moving direction of the motor piston by a driver's pedal force, the method comprising: a step of receiving a stroke of a brake pedal; a step of calculating a required hydraulic braking force and a required stepping force based on the pedal stroke; and a step of determining a required displacement of the motor piston for generating the required hydraulic braking force and the required stepping force using a contact area between the operating rod and the reaction disc.

DETAILED DESCRIPTION

In view of the above, an electric booster according to an embodiment of the present disclosure is configured so that an electric booster unit performs regenerative braking alone, so that the specification of an ESC operating unit is minimized, thus reducing cost, minimizing the constraints of the regenerative braking, and thereby increasing fuel efficiency.

Furthermore, an electric booster according to an embodiment of the present disclosure includes an operating rod having an end that is convex toward a reaction disc, thus preventing a driver from feeling a different pedal feel and simultaneously allowing a regenerative braking pedal section to be extended.

The problems to be solved by the present disclosure are not limited to the above-mentioned problems, and other problems which are not mentioned will be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, alphanumeric codes such as first, second, i), ii), (a), (b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto. The terms such as 'unit,' 'module,' and the like refer to one or more units for processing at least one function or operation, which may be implemented by hardware, software, or a combination thereof.

Figure 1:
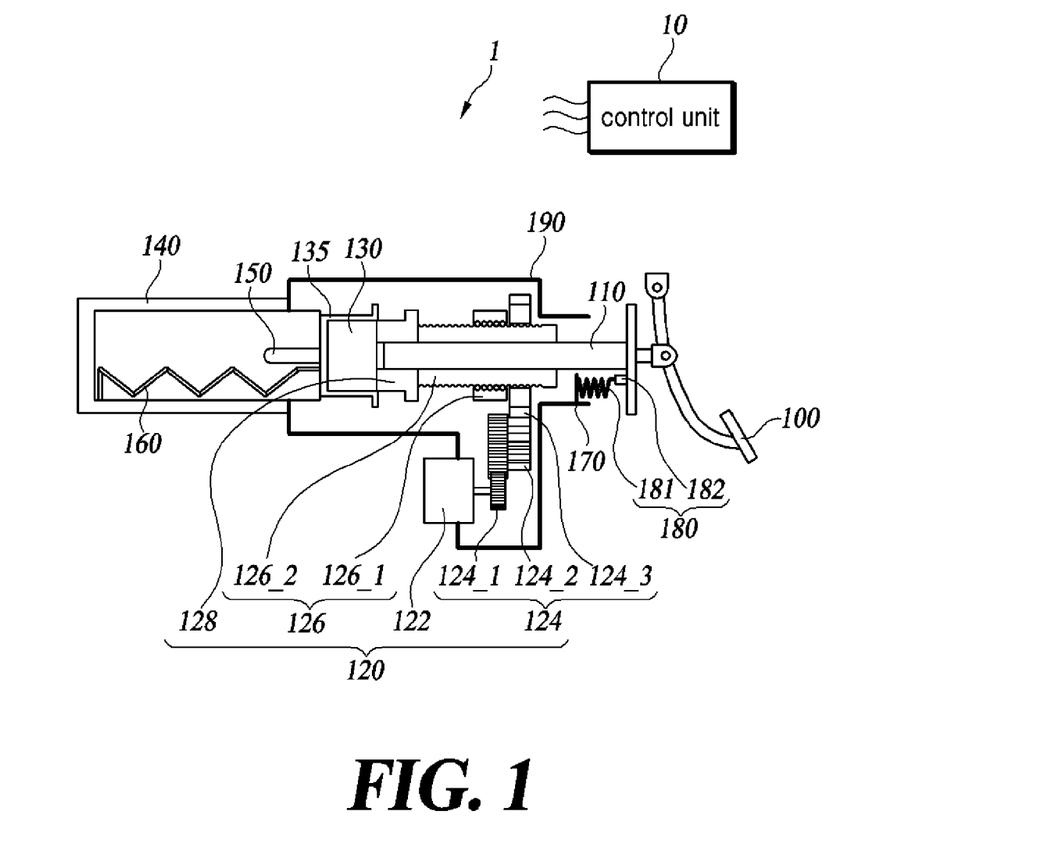
FIG. 1 is a conceptual diagram illustrating the initial state of an electric booster according to an embodiment of the present disclosure.

FIG. 1 is a sectional view of an electric booster according to an embodiment of the present disclosure.

Referring to FIG. 1, the electric booster 1 according to an embodiment of the present disclosure includes all or some of a brake pedal 100, an operating rod 110, an electric booster unit 120, a reaction disc 130, a master cylinder 140, a push rod 150, a return spring 160, and a control unit 10.

The brake pedal 100 is a part on which a driver steps so as to decelerate or stop a vehicle. If the driver steps on the brake pedal 100, the operating rod 110 moves in a direction in which the driver steps on the brake pedal 100. On the other hand, the electric booster 1 according to an embodiment of the present disclosure may include a pedal sensor (not shown) configured to measure the stroke of the brake pedal 100.

The operating rod 110 as a medium for transmitting a stepping force when the brake pedal 100 is stepped to the reaction disc 130 is configured to adjust displacement according to the stroke of the brake pedal 100. The operating rod is configured to rectilinearly move in a direction parallel to the moving direction of the motor piston 128 by the driver's pedal force. One end of the operating rod 110 is connected to the brake pedal 100, and the other end thereof contacts the reaction disc 130. If the driver steps on the brake pedal 100 to press the operating rod 110 to a predetermined pressure or more, the operating rod 110 may move toward the reaction disc 130 to press the reaction disc 130.

On the other hand, in an initial state where the brake pedal 100 starts to be stepped, the operating rod 110 may be spaced apart from the reaction disc 130 by a predetermined distance. In this case, even if the driver steps on the brake pedal 100, the operating rod 110 may not press the reaction disc 130.

The motor piston 128 is configured to be rectilinearly moved by driving the motor 122 along an axis parallel to another axis along which the operating rod 100 moves. As the displacement of the motor piston 128 is adjusted, the master cylinder 140 may be pressed. The electric booster unit 120 may include a motor 122, a gear unit 124, a screw shaft 126, and a motor piston 128.

The motor 122 is configured to rotate forward or backward about the axis of the motor 122 as the control unit 10 is controlled.

The gear unit 124 is configured to transmit a rotational torque according to the rotary motion of the motor 122 to the screw shaft 126. To this end, the gear unit 124 may include a first gear 124_1, a second gear 124_2, and a third gear 124_3.

The first gear 124_1 primarily receives the rotational torque of the motor 122, and transmits the rotational torque to the second gear 124_2. The second gear 124_2 transmits the rotational torque received from the first gear 124_1 to the third gear 124_3. The third gear 124_3 transmits the rotational torque received from the second gear 124_2 to the screw shaft 126. Based on the ratio of the number of teeth of the first gear 124_1 to the third gear 1243, the rotational speed may be reduced or increased at a certain rate while the rotational torque is transmitted from the first gear 1241 to the third gear 124_3.

The screw shaft 126 is configured to receive the rotational torque from the gear unit 124, and convert the rotary motion into the rectilinear motion. To this end, the screw shaft 126 may include a first shaft 126_1 and a second shaft 126_2.

The first shaft 126_1 rotates while being constrained by the third gear 1243, and the second shaft 126_2 is configured to convert the rotary motion of the first shaft 126_1 into the rectilinear motion. Preferably, the first shaft 126_1 may be formed of a pinion, while the second shaft 126_2 may be formed of a rack. Further, since one end of the second shaft 126_2 is connected to the motor piston 128, the motor piston 128 may perform a forward movement toward the reaction disc 130 or a backward movement of a reverse direction as the motor 122 is driven.

The motor piston 128 may be rectilinearly moved by the gear unit 124 and the screw shaft 126, in other words, may be moved forward or backward. When the motor piston 128 moves forwards, the motor piston 128 may press the reaction disc 130. The master cylinder 140 is configured to generate hydraulic pressure as the reaction disc 130 moves.

The reaction disc 130 is configured to be pressed and moved by at least one of the operating rod 110 and the motor piston 128. Although FIG. 1 shows a state in which the reaction disc 130 and the motor piston 128 contact each other, the motor piston 128 may be spaced apart from the reaction disc 130 when braking is not required.

When the reaction disc 130 is pressed by at least one of the operating rod 110 and the motor piston 128, a reaction force formed by the pressing force may be transmitted through the operating rod 110 to a driver, so that the driver may feel a pedal feel.

The reaction disc 130 may be configured such that the central portion of the reaction disc 130 is pressed by the operating rod 110, and the outer portion of the reaction disc 130 is pressed by the motor piston 128. To this end, the longitudinal section of the motor piston 128 may be of an annular type, and the operating rod 110 may be configured to pass through a hollow portion (not shown) that is formed in the center of the motor piston 128. In this case, it is preferable that the operating rod 110 and the reaction disc 130 be coaxially arranged.

On the other hand, the reaction disc 130 may be formed of an elastic material. For example, at least a portion of the reaction disc 130 may be formed of a rubber material. Thus, when the motor piston 128 presses the reaction disc 130, the central portion of the reaction disc 130 may protrude toward the operating rod 110.

The electric booster 1 according to an embodiment of the present disclosure may further include a disc holder 135 that is disposed between the reaction disc 130 and the master cylinder 140 and accommodates at least a portion of the reaction disc 130. When the reaction disc 130 is pressed and moved forward by at least one of the operating rod 110 and the motor piston 128, the push rod 150 formed on a side of the disc holder 135 may be configured to move forward.

The master cylinder 140 is configured to receive brake fluid therein. By pressing the brake fluid in the master cylinder 140, hydraulic pressure used to brake the vehicle may be generated. At this time, the generated hydraulic pressure is transmitted through an Electronic Stability Control (ESC) operating unit (not shown) to a plurality of wheel brakes (not shown).

The push rod 150 is configured to press the master cylinder 140 as the reaction disc 130 moves. To this end, the push rod 150 may be configured such that at least a portion thereof is inserted into the master cylinder 140. In this case, the push rod 150 may reciprocate in the longitudinal direction of the master cylinder 140 within the master cylinder 140. When the push rod 150 moves forwards, the brake fluid stored in the master cylinder 140 may be pressed.

The return spring 160 is disposed in the master cylinder 140, and is compressed or expanded by the reciprocating motion of the push rod 150. The return spring 160 may be formed of a coil spring, but may be formed of a plate spring or an elastic material such as rubber without being limited thereto. When the hydraulic braking is not performed using the return spring 160, the reaction disc 130, the motor piston 128, the operating rod 110, and the brake pedal 100 may return to their original positions.

On the other hand, the electric booster 1 according to an embodiment of the present disclosure may include an elastic body fixing unit 170 and an elastic body 180 to generate a stepping force.

The elastic body fixing unit 170 is fixed to a housing 190, and at least a portion of the elastic body 180 is attached to a surface of the elastic body fixing unit 170. When the driver steps on the brake pedal 100 to press the elastic body 180, the elastic body fixing unit 170 is formed to support the elastic body 180.

The elastic body 180 is disposed such that one end thereof contacts the operating rod 110 and the other end thereof contacts the elastic body fixing unit 170. The elastic body 180 generates an elastic force as the operating rod 110 moves. The elastic body 180 may be formed of the spring 181 or a combination of the spring 181 and the damper 182. Although FIG. 1 shows that the spring 181 and the damper 182 are connected in series, the spring 181 and the damper 182 may be connected in parallel without being limited thereto.

When the driver steps on the brake pedal 100, the operating rod 110 compresses the elastic body 180 while moving toward the reaction disc 130. Since the compressed elastic body 180 forms the reaction force that is the elastic force, it is possible to provide a stepping force to the driver. Thus, even if the operating rod 110 does not contact the reaction disc 130 and thus the reaction force is not formed from the reaction disc 130, the reaction force may be formed from the elastic body 180, so that the driver can feel the stepping force. Further, since the elastic body 180 is connected to the elastic body fixing unit 170, the driver may not feel a different pedal feel even when pressure in the master cylinder 140 changes.

The pedal sensor detects the stroke of the brake pedal 100. The control unit 10 controls the operation of the motor 122. The control unit 10 receives the stroke of the brake pedal 100 from the pedal sensor, and calculates a required hydraulic braking force and a required stepping force based on the stroke. The control unit 10 determines the required displacement of the motor piston 128 to generate the required hydraulic braking force and the required stepping force using a contact area between the operating rod 110 and the reaction disc 130. The control unit 10 may calculate a required braking force based on the stroke of the brake pedal 100, calculate a required regenerative braking force based on the required braking force, and calculate a required hydraulic braking force based on a difference value between the required braking force and the required regenerative braking force.

The control unit 10 calculates the compensation displacement of the motor piston 128 to generate a required hydraulic braking force, and calculates a stepping force forming displacement that is the position of the motor piston 128 to generate a required stepping force. The control unit 10 may calculate the sum value of the compensation displacement and the stepping force forming displacement, and may determine the required displacement of the motor piston using the sum value and the contact area between the reaction disc 130 and the operating rod 110.

Figure 2:
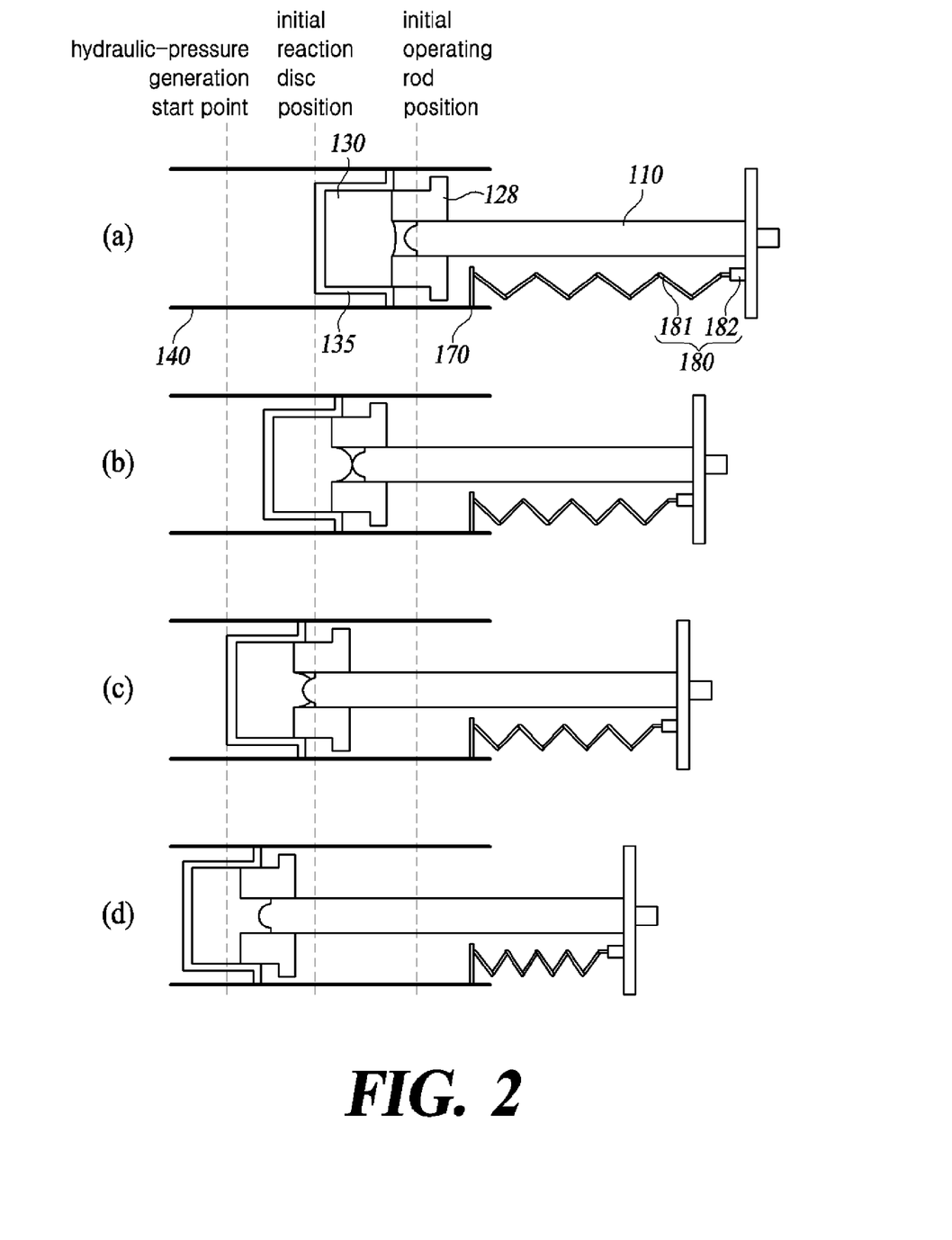
FIG. 2 is a state diagram illustrating a driving state during the regenerative braking of the electric booster according to an embodiment of the present disclosure.

FIG. 2 is a state diagram illustrating a driving state during the regenerative braking of the electric booster according to an embodiment of the present disclosure.

Figure 3:
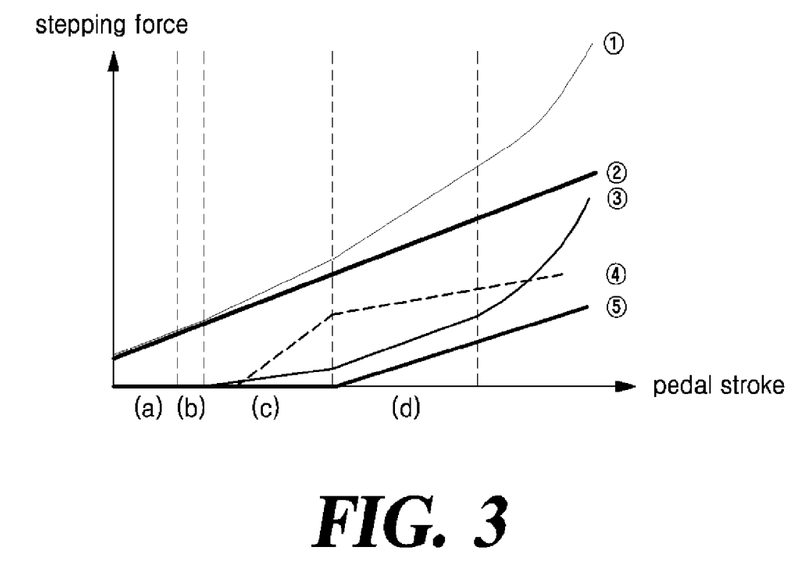
FIG. 3 is a graph illustrating a relationship between a pedal stroke and a stepping force for each section during the regenerative braking of the electric booster according to an embodiment of the present disclosure.

FIG. 3 is a graph illustrating a relationship between a pedal stroke and a stepping force for each section during the regenerative braking of the electric booster according to an embodiment of the present disclosure. Curves, and of FIG. 3 represent the stepping force according to the pedal stroke, the elastic body reaction force, the reaction force of the reaction disc, the regenerative braking force, and the hydraulic braking force, respectively.

Referring to FIGS. 2 and 3, the driving state during the regenerative braking of the electric booster according to an embodiment of the present disclosure may be divided into four steps of (a) to (d) according to the stroke of the brake pedal 100. Here, the term "regenerative braking" refers to a case where the regenerative braking unit and the hydraulic braking unit cooperate to perform braking and thus supply the braking force to the vehicle. In the present disclosure, a force for braking the vehicle by the regenerative braking of a power train (not shown) of the vehicle is referred to as a regenerative braking force, and a braking force generated when the hydraulic pressure of the master cylinder 140 is transmitted to a wheel side is referred to as a hydraulic braking force. In the present disclosure, the displacement means the displacement from the lowest point of the stroke of each component, that is, the position that is most spaced apart from the master cylinder 140.

FIG. 2(a) and FIG. 3(a) show an invalid stroke section in which the regenerative braking force and the hydraulic braking force are not generated. A driver may feel a pedal feel by the elastic force of the elastic body 150.

FIG. 2(b) and FIG. 3(b) show a section in which the regenerative braking is performed without the hydraulic braking. In this case, only the regenerative braking force is generated as the braking force. A driver may feel a pedal feel by the elastic force of the elastic body 150. From a point where the reaction disc 130 and the operating rod 110 start to contact each other, the driver may feel the pedal feel by the elastic force of the elastic body 150 and the reaction force of the force pressing the reaction disc 130.

In the section of FIG. 2(c) and FIG. 3(c), the reaction disc 130 is at a point before hydraulic pressure is generated in the master cylinder 140. In this case, the vehicle is braked only by the regenerative braking force. A driver may feel the pedal feel by the elastic force of the elastic body 150 and the reaction force of the force pressing the reaction disc 130.

In the section of FIG. 2(d) and FIG. 3(d), the reaction disc 130 is compressed to a position where it may generate hydraulic pressure in the master cylinder 140. In this case, the vehicle is braked by the regenerative braking force and the hydraulic braking force. A driver may feel the pedal feel by the elastic force of the elastic body 150 and the reaction force of the force pressing the reaction disc 130.

Figure 4:
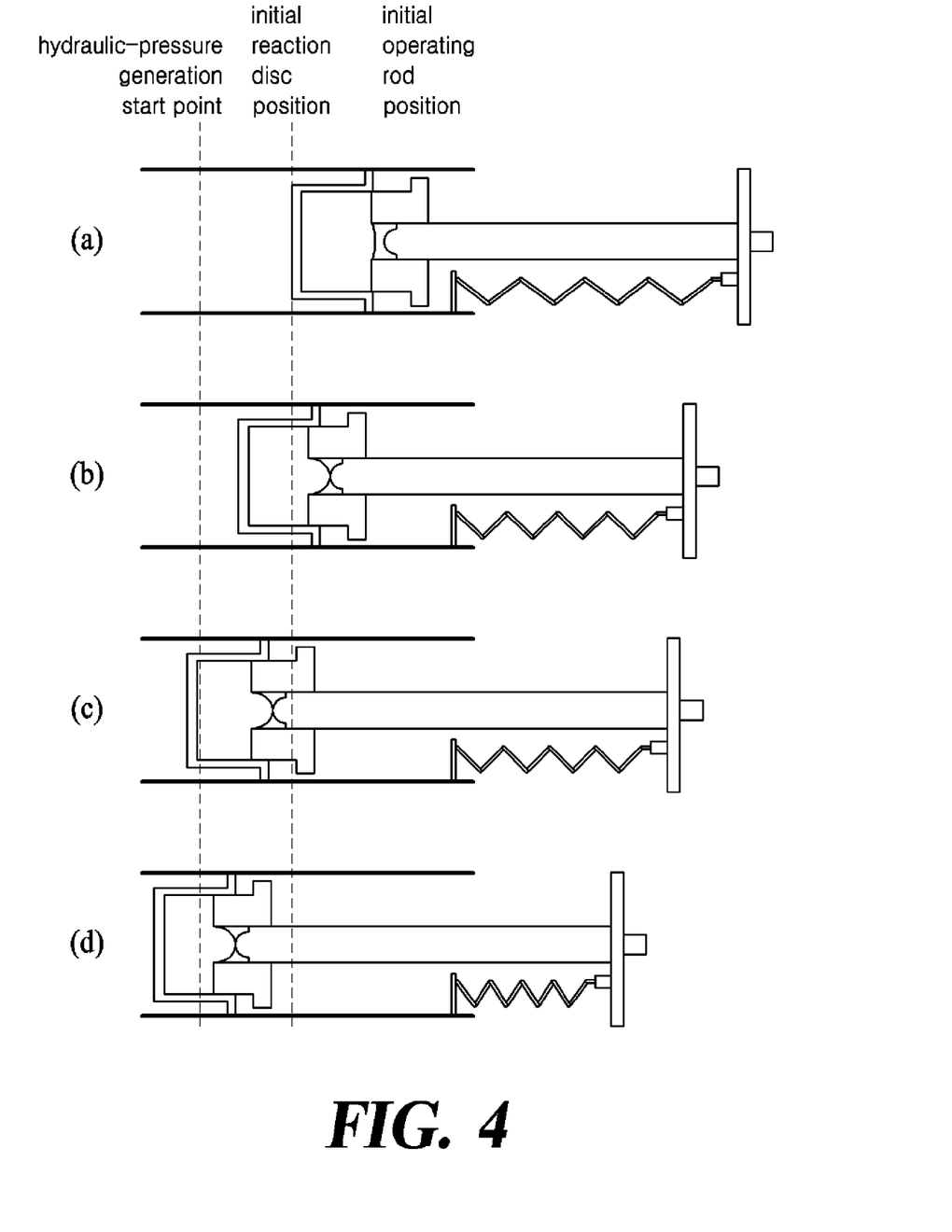
FIG. 4 is a state diagram illustrating a driving state during the hydraulic braking of the electric booster according to an embodiment of the present disclosure.

FIG. 4 is a state diagram illustrating a driving state during the hydraulic braking of the electric booster according to an embodiment of the present disclosure.

Figure 5:
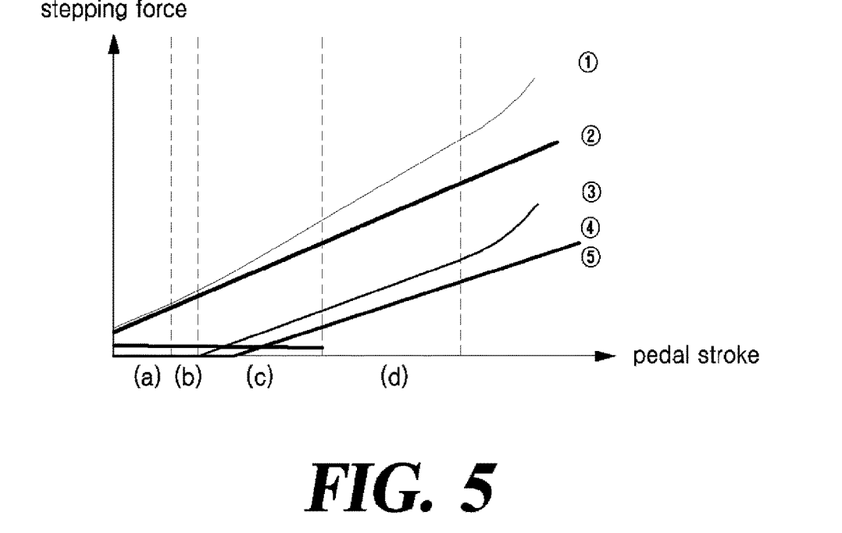
FIG. 5 is a graph illustrating a relationship between a pedal stroke and a stepping force for each section during the hydraulic braking of the electric booster according to an embodiment of the present disclosure.

FIG. 5 is a graph illustrating a relationship between a pedal stroke and a stepping force for each section during the hydraulic braking of the electric booster according to an embodiment of the present disclosure. Curves, and of FIG. 5 represent the stepping force according to the pedal stroke, the elastic body reaction force, the reaction force of the reaction disc, and the hydraulic pressure of the master cylinder, respectively.

Referring to FIGS. 4 and 5, the driving state during the regenerative braking of the electric booster 1 according to an embodiment of the present disclosure may be divided into four steps of (a) to (d) according to the stroke of the brake pedal 100. Here, the term "hydraulic braking" refers to a case where the vehicle is braked only by the hydraulic braking force without the regenerative braking force.

FIG. 4(a) and FIG. 5(a) show an invalid stroke section in which the regenerative braking force and the hydraulic braking force are not generated. A driver may feel the pedal feel by the elastic force of the elastic body 150.

FIG. 4(b) and FIG. 5(b) show a section in which the regenerative braking is performed without the hydraulic braking. In this case, only the regenerative braking force is generated as the braking force. A driver may feel a pedal feel by the elastic force of the elastic body 150. From a point where the reaction disc 130 and the operating rod 110 start to contact each other, the driver may feel the pedal feel by the elastic force of the elastic body 150 and the reaction force of the force pressing the reaction disc 130.

In the section of FIG. 4(c) and FIG. 5(c), the reaction disc 130 is compressed to a position where it may generate hydraulic pressure in the master cylinder 140. A driver may feel the pedal feel by the elastic force of the elastic body 150 and the reaction force of the force pressing the reaction disc 130.

In the section of FIG. 4(d) and FIG. 5(d), the reaction disc 130 is compressed to a position where it may generate hydraulic pressure in the master cylinder 140. In this case, the vehicle is braked by the regenerative braking force and the hydraulic braking force. A driver may feel the pedal feel by the elastic force of the elastic body 150 and the reaction force of the force pressing the reaction disc 130.

A comparison of a braking-force and stepping-force generation mechanism during the regenerative braking and the hydraulic braking of the electric booster 1 according to an embodiment of the present disclosure is as follows.

During both the regenerative braking and the hydraulic braking, a driver feels a pedal feel by the elastic force of the elastic body 150 in section (a).

During both the regenerative braking and the hydraulic braking, a driver feels a pedal feel by the elastic force of the elastic body 150 and the reaction force of the force pressing the reaction force 130 in section (b) to (d).

During both the regenerative braking and the hydraulic braking, the displacement of the operating rod 110 is the same in section (d). However, since the required braking force should be satisfied only with the hydraulic braking force without the regenerative braking force during the hydraulic braking, the displacement of the motor piston 125 and the reaction disk 130 is large to form or generate a larger hydraulic pressure in the master cylinder 140. Nevertheless, the electric booster 1 according to an embodiment of the present disclosure may generate the stepping force of approximately the same magnitude according to the stroke of the operating rod 110 during the regenerative braking and the hydraulic braking using the characteristics of the reaction disk 130 or the operating rod 110.

Figure 6:
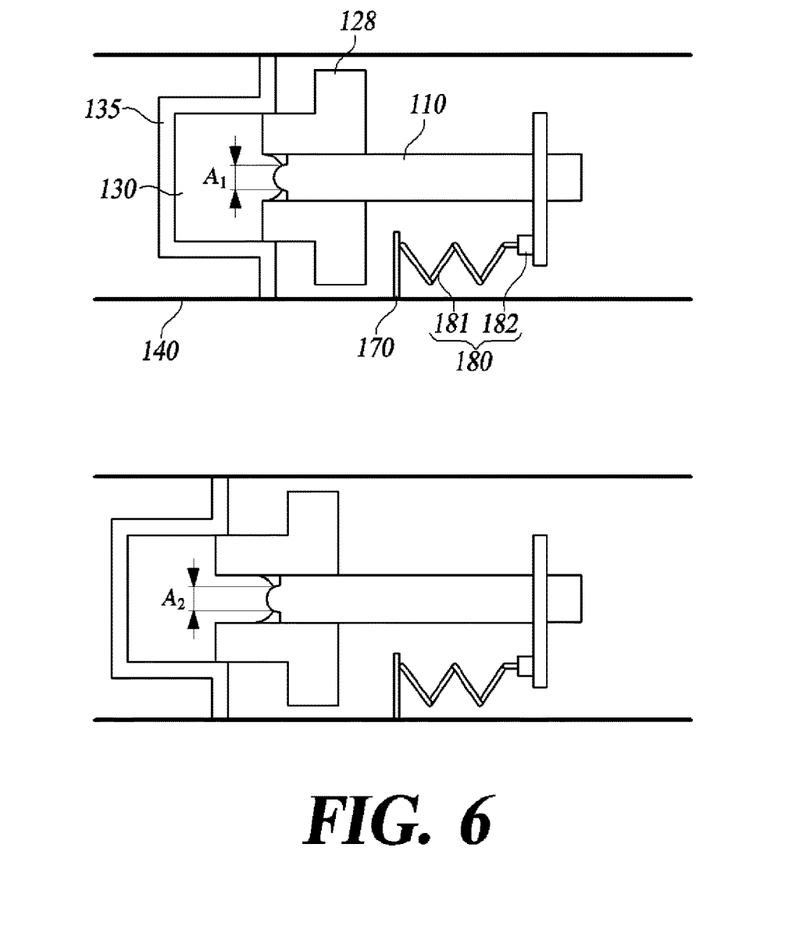
FIG. 6 is a sectional view for explaining a principle in which the electric booster according to an embodiment of the present disclosure generates similar stepping force during regenerative braking and during hydraulic braking.

FIG. 6 is a sectional view for explaining a principle in which the electric booster 1 according to an embodiment of the present disclosure generates similar stepping force during regenerative braking and during hydraulic braking.

A mechanism for generating the stepping force of approximately the same magnitude during regenerative braking and during hydraulic braking in section (d) (see FIGS. 2 to 5) will be described with reference to FIG. 6.

As in Equation 1, the pedal stroke $x_{k1}$ during the regenerative braking is the same as the pedal stroke $x_{k2}$ during the hydraulic braking in section (d).

$$x_{k1} = x_{k2} \qquad \text{[Equation 1]}$$

Since the elastic force of the elastic body 150 is proportional to the displacement of the operating rod 110 connected to the elastic body 150, the reaction force $kx_{k1}$ generated by the elastic body 150 during the regenerative braking is the same as the reaction force $kx_{k2}$ generated by the elastic body 150 during the hydraulic braking as in Equation 2. K is the elastic modulus of the elastic body 150.

$$kx_{k1} = kx_{k2} \qquad \text{[Equation 2]}$$

The stepping force in section (d) (see FIGS. 2 to 5) during both the hydraulic braking and the regenerative braking is determined by the elastic force of the elastic body 150 and the reaction force of the force pressing the reaction disc 130. However, the displacement of the reaction disc 130 during the hydraulic braking is larger than the displacement of the reaction disc 130 during the regenerative braking. Since the displacement of the reaction disc 130 during the hydraulic braking is large, the hydraulic pressure applied to the reaction disc 130 during the hydraulic braking is larger than the hydraulic pressure applied to the reaction disc 130 during the regenerative braking. Therefore, a force applied to the reaction disc 130 by the hydraulic pressure of the master cylinder 140 during the regenerative braking is smaller than a force applied to the reaction disc 130 by the hydraulic pressure of the master cylinder 140 during the hydraulic braking. Thus, pressure $P_{rd1}$ of the reaction disc 130 during the regenerative braking is smaller than pressure $P_{rd2}$ of the reaction disc 130 during the hydraulic braking as in Equation 3.

$$P_{rd1} < P_{rd2} \quad \text{[Equation 3]}$$

Thus, the motor piston 125 supports a larger load during the hydraulic braking than during the regenerative braking. Since the reaction disc 130 is compressed with a larger force by the motor piston 125 during the hydraulic braking, the reaction disc 130 is more convexly deformed toward the operating rod 110 as compared to during the regenerative braking. Thus, a contact area Arai between the reaction disc 130 and the operating rod 110 during the regenerative braking is larger than a contact area $A_{rd2}$ between the reaction disc 130 and the operating rod 110 during the hydraulic braking (Equation 4).

$$A_{rd1} > A_{rd2} \quad \text{[Equation 4]}$$

Referring to FIG. 6, a stepping force $F_{pedal1}$ transmitted to the pedal by the operating rod 110 during the regenerative braking and a stepping force $F_{pedal2}$ transmitted to the pedal by the operating rod 110 during the hydraulic braking satisfy Equation 5.

$$F_{pedal1} = P_{rd1} A_1 + k x_{k1}$$

$$F_{pedal2} = P_{rd2} A_2 + k x_{k2} \quad \text{[Equation 5]}$$

Equation 5 may be rearranged as Equation 6 by Equation 3 and Equation 4.

$$F_{pedal1} \approx F_{pedal2} \quad \text{[Equation 6]}$$

In other words, since the contact area between the reaction disk 130 and the operating rod 110 during the regenerative braking is set to be different from the contact area during the hydraulic braking, it is possible to make the stepping force during the regenerative braking and the stepping force during the hydraulic braking almost the same.

The control unit 10 according to an embodiment of the present disclosure may control the regenerative braking unit so that the regenerative braking force that is the braking force generated by the regenerative braking unit is increased as the displacement of the operating rod 110 increases. In this case, the moving displacement of the operating rod 110 may be increased by increasing a gap between the operating rod 110 and the reaction disc 130 to increase the proportion of the regenerative braking. However, if the gap between the operating rod 110 and the reaction disc 130 increases, the section forming the stepping force only by the elastic force of the elastic body 150 is lengthened. If the section forming the stepping force only by the elastic force of the elastic body 150 is lengthened, a driver may feel a different pedal feel.

Figure 7:
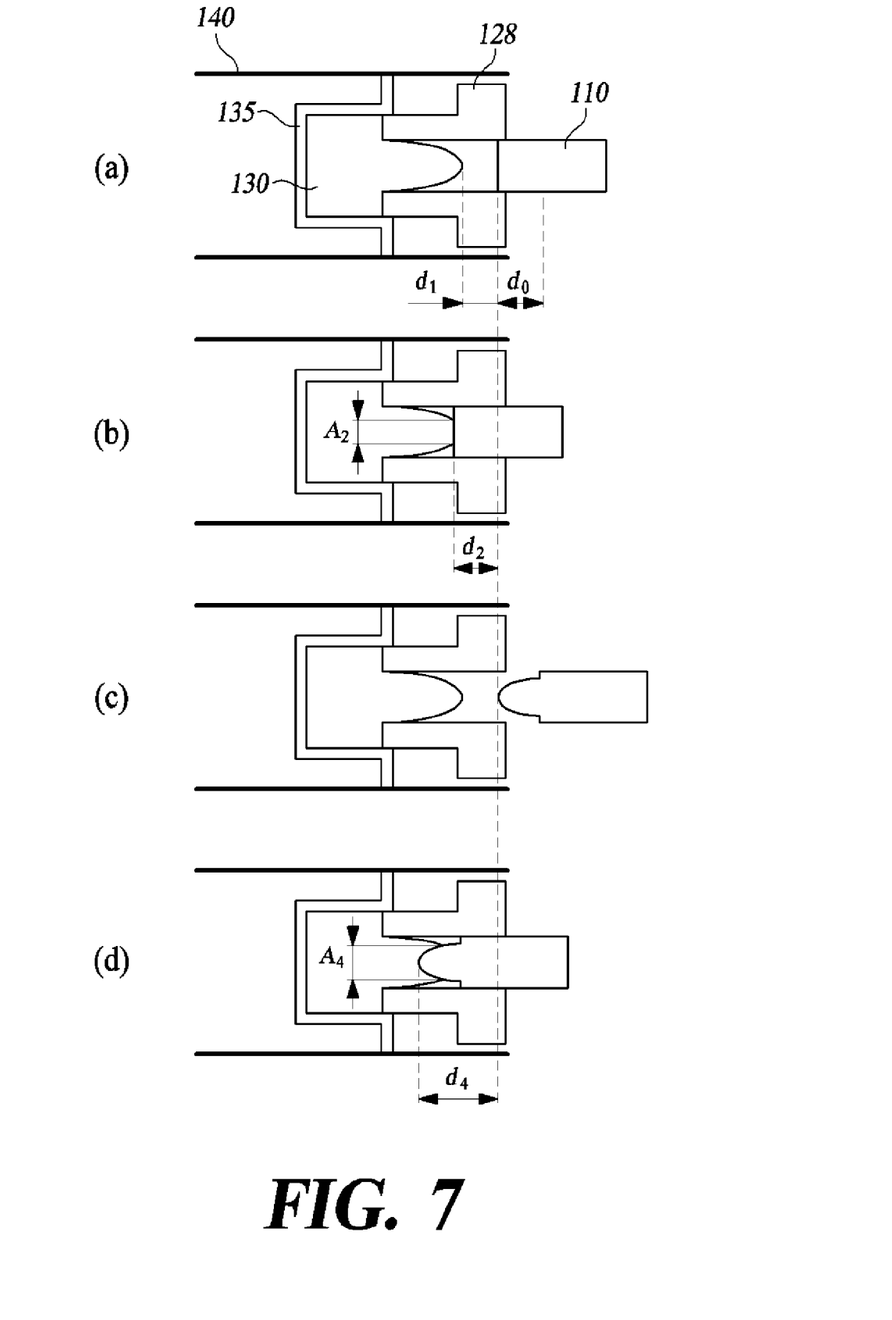
FIG. 7 is a sectional view for explaining the regenerative braking range of the electric booster according to an embodiment of the present disclosure.

FIG. 7 is a sectional view for explaining the regenerative braking range of the electric booster 1 according to an embodiment of the present disclosure. Here, the term "displacement" means a displacement from the stroke lowest point of the operating rod 110. The term "contact area" means an area obtained by projecting a contact surface between the reaction disc 130 and the operating rod 110 onto a surface perpendicular to the pressing direction of the operating rod 110.

Referring to (a) of FIG. 7, the maximum displacement among the displacement forming the stepping force only with the elastic force of the elastic body 150 is assumed to be $d_0 + d_1$. Here, $d_0$ represents the length of an invalid stroke section in which the braking force is not formed even if the operating rod 110 is stepped, and $d_1$ represents a distance from a point where the displacement is $d_0$ to the reaction disc 130.

Referring to (b) of FIG. 7, when the section of the reaction disc 130 of the operating rod 110 is flat, the maximum displacement of the operating rod 110 preventing the hydraulic braking force from being generated is denoted by $d_2$. If the displacement is larger than $d_2$, the hydraulic braking force is generated. When the displacement is $d_2$, the regenerative braking force has a maximum value. When the displacement is $d_2$, the stepping force acting on the operating rod 110 is expressed by Equation 7.

$$A_2 \times P_{rd} = F_{pedal\_regenmax} \quad \text{[Equation 7]}$$

$F_{pedal\_regenmax}$ is the maximum value of the regenerative braking force. $A_2$ is the contact area when the regenerative braking force is maximum. $P_{rd}$ is the pressure applied to the operating rod 110 by the reaction disc 130 when the regenerative braking force is maximum.

The contact area according to an embodiment of the present disclosure varies depending on a relative displacement between the reaction disc 130 and the operating rod 110. For example, referring to (c) of FIG. 7, an end of the reaction disc 130 of the operating rod 110 according to an embodiment of the present disclosure has a convex shape bulging toward the reaction disc 130. Thus, as the operating rod 110 moves from a contact point with the reaction disc 130 toward the master cylinder 140, the contact area may be increased.

It is assumed that the when the section of the operating rod 110 is flat and when the section of the operating rod 110 is convex, the stepping force formed by the reaction disk 130 is the same when the regenerative braking force is maximum.

In addition, it is assumed that the when the section of the operating rod 110 is flat and when the section of the operating rod 110 is convex, the pressure applied to the operating rod 110 by the reaction disk 130 is the same when the regenerative braking force is maximum. Thus, the contact area $A_4$ when the regenerative braking force is maximum in the case where the section of the operating rod 110 is convex should be the same as the contact area $A_2$ when the regenerative braking force is maximum in the case where the section of the operating rod 110 is flat. That is, Equation 8 should be satisfied.

$$A_2 = A_4 \quad \text{[Equation 8]}$$

Referring to (b) and (d) of FIG. 7, the moving displacement of the operating rod 110 for satisfying Equation 8 is denoted by $d_2$ and $d_4$, respectively, when the section of the operating rod 110 is flat and when the section of the operating rod 110 is convex, and $d_2$ and $d_4$ satisfy Equation 9.

$$d_2 < d_4 \quad \text{[Equation 9]}$$

The electric booster 1 according to an embodiment of the present disclosure may perform regenerative braking at larger displacement, because the end of the reaction disc 130 of the operating rod 110 has a shape convex toward the reaction disc 130. As the pedal section capable of regenerative braking becomes longer, the fuel efficiency of the vehicle is improved.

Figure 8:
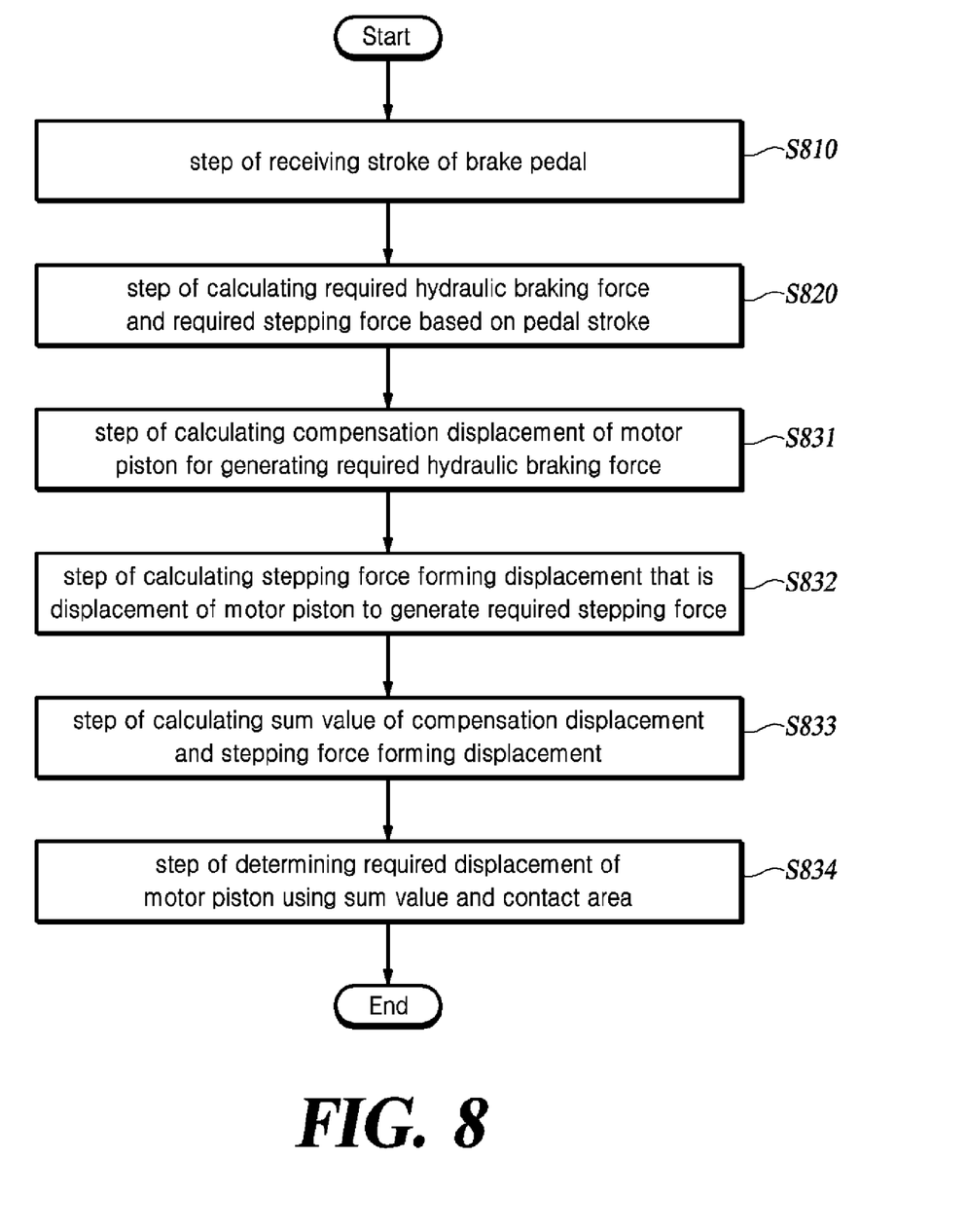
FIG. 8 is a flowchart illustrating a method of controlling an electric booster according to an embodiment of the present disclosure.

FIG. 8 is a flowchart illustrating a method of controlling an electric booster according to an embodiment of the present disclosure.

Referring to FIG. 8, the method of controlling the electric booster according to an embodiment of the present disclosure receives the stroke of the brake pedal 100 from a brake sensor (S810). Based on the received pedal stroke, the required hydraulic braking force and the required stepping force are calculated (S820). As the stroke of the brake pedal 100 increases, the required hydraulic braking force and the required stepping force may be calculated to be increased. After the required hydraulic braking force and the required stepping force are calculated, the required displacement of the motor piston 125 for generating the required hydraulic braking force and the required stepping force using the contact area between the operating rod 110 and the reaction disc 130 is determined (S830).

The contact area between the operating rod 110 and the reaction disc 130 may be a value that varies depending on the material or specification, such as a thickness, of the reaction disc 130, the shape of the operating rod 110, the stroke of the operating rod 110, and the relative displacement between the reaction disc 130 and the motor piston 125. The contact area between the operating rod 110 and the reaction disc 130 may be converted into the form of a Look-Up Table (LUT) according to the stroke of the reaction disc 130 and the operating rod 110 and the relative displacement between the reaction disc 130 and the motor piston through an experiment and then be stored in a memory of the control unit 10.

The compensation displacement of the motor piston 125 for generating the required hydraulic braking force so as to determine the required displacement may be calculated (S831). In addition, the stepping force forming displacement that is or corresponds to the displacement of the motor piston 125 so as to generate the required stepping force is calculated (S832). Although FIG. 8 shows that the stepping force forming displacement is calculated after the compensation displacement is calculated, the compensation displacement may be calculated after the stepping force forming displacement is calculated or the compensation displacement and the stepping force forming displacement may be simultaneously calculated. Subsequently, the compensation displacement and the stepping force forming displacement are summed (S833). The required displacement of the motor piston may be determined using the sum of the compensation displacement and the stepping force forming displacement and the contact area (S834).

Figure 9:
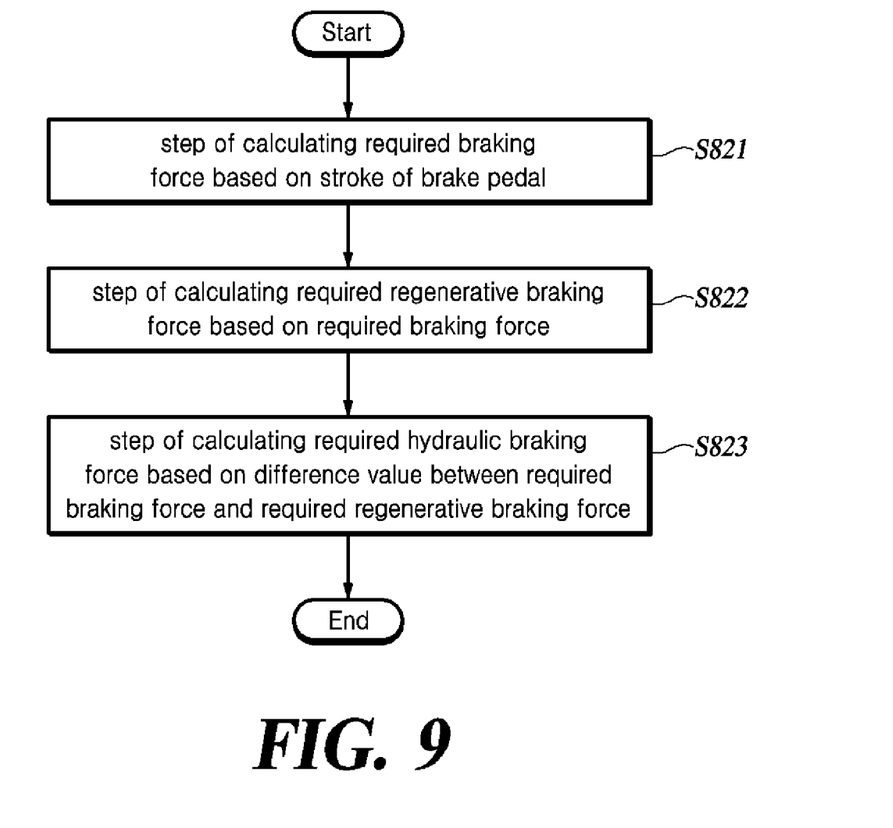
FIG. 9 is a flowchart illustrating a process of calculating a required hydraulic braking force in the control method of the electric booster according to an embodiment of the present disclosure.

FIG. 9 is a flowchart illustrating a process of calculating a required hydraulic braking force in the control method of the electric booster according to an embodiment of the present disclosure.

Referring to FIG. 9, the method of controlling the electric booster according to an embodiment of the present disclosure may first calculate the required braking force based on the stroke of the brake pedal 100 so as to calculate the hydraulic braking force (S821). Based on the calculated required braking force, the required regenerative braking force is calculated (S822). The power train (not shown) of the vehicle may receive the calculated required regenerative braking force and then generate the regenerative braking force. Based on a difference value between the required braking force and the required regenerative braking force, the required hydraulic braking force may be calculated (S823). For example, the difference between the required braking force and the required regenerative braking force may be directly set as the required hydraulic braking force.

According to an embodiment, an electric booster is advantageous in that an electric booster unit performs regenerative braking alone, so that the specification of an ESC operating unit is minimized, thus reducing cost, minimizing the constraints of the regenerative braking, and thereby increasing fuel efficiency.

Furthermore, according to an embodiment, an electric booster is advantageous in that it includes an operating rod having an end that is convex toward a reaction disc, thus preventing a driver from feeling a different pedal feel and simultaneously allowing a regenerative braking pedal section to be extended.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. An electric booster comprising:
a motor piston configured to rectilinearly move along a first axis in response to an operation of a motor;
an operating rod configured to rectilinearly move in a second axis in response to a driver's force applied to a brake pedal, the second axis being parallel to the first axis;
a reaction disc configured to move when pressed by at least one of the motor piston and the operating rod;
a master cylinder configured to generate a hydraulic pressure when the reaction disc moves;
a pedal sensor configured to detect a stroke of the brake pedal; and
a control unit configured to control the motor,
wherein the control unit is configured to:
 receive the stroke of the brake pedal detected by the pedal sensor;
 calculate, based on the stroke of the brake pedal, a required hydraulic braking force and a required stepping force; and
 determine a required displacement of the motor piston for generating, using a contact area between the operating rod and the reaction disc, the required hydraulic braking force and the required stepping force, and
wherein the control unit is further configured to:
 calculates a required braking force based on the stroke of the brake pedal;
 calculates a required regenerative braking force based on the required braking force; and
 calculates a required hydraulic braking force based on a difference between the required braking force and the required regenerative braking force.

2. The electric booster of claim 1, wherein the contact area varies depending on a relative displacement between the reaction disc and the operating rod.

3. The electric booster of claim 1, wherein an end of the reaction disc has a convex shape bulging toward the reaction disc.

4. The electric booster of claim 1, wherein the control unit is configured to:
calculates a compensation displacement of the motor piston for generating the required hydraulic braking force;

calculates a stepping force forming displacement corresponding to a position of the motor piston for generating the required stepping force;

calculates a sum of the compensation displacement and the stepping force forming displacement; and determines, based on the contact area and the sum, the required displacement of the motor piston.

5. The electric booster of claim 1, further comprising a disc holder disposed between the reaction disc and the master cylinder and configured to accommodate at least a portion of the reaction disc.

6. The electric booster of claim 1, wherein the reaction disc has:

a central portion disposed to be pressed by the operating rod; and an outer portion disposed to be pressed by the motor piston.

7. The electric booster of claim 1, further comprising a screw shaft configured to rotate in response to receiving a rotational torque from a gear unit and convert a rotary motion into a rectilinear motion, wherein the motor piston is configured to be rectilinearly moved by the gear unit and the screw shaft.

8. A method of controlling an electric booster comprising a reaction disc and a master cylinder configured to generate a hydraulic pressure in response to a movement by the reaction disc, wherein the reaction disc is pressed by at least one of (1) a motor piston configured to rectilinearly move along a first axis in response to an operation of a motor and (2) an operating rod configured to rectilinearly move along a second axis parallel to the first axis in response to a driver's force applied to a brake pedal, the method comprising:

receiving a stroke of the brake pedal;

calculating, based on the received stroke of the brake pedal, a required hydraulic braking force and a required stepping force; and determining a required displacement of the motor piston for generating, using a contact area between the operating rod and the reaction disc, the required hydraulic braking force and the required stepping force, wherein calculating the required hydraulic braking force and the required stepping force comprises:

calculating a required braking force based on the stroke of the brake pedal;

calculating a required regenerative braking force based on the required braking force; and calculating a required hydraulic braking force based on a difference between the required braking force and the required regenerative braking force.

9. The method of claim 8, wherein determining the required displacement of the motor piston comprises:

calculating a compensation displacement of the motor piston for generating the required hydraulic braking force;

calculating a stepping force forming displacement corresponding to a displacement of the motor piston for generating the required stepping force;

calculating a sum of the compensation displacement and the stepping force forming displacement; and determining a required displacement of the motor piston based on the sum value and the contact area.

* * * * *